(No Model.)
J. F. MUNSIE.
INSULATING LINING.
No. 426,201. Patented Apr. 22, 1890.
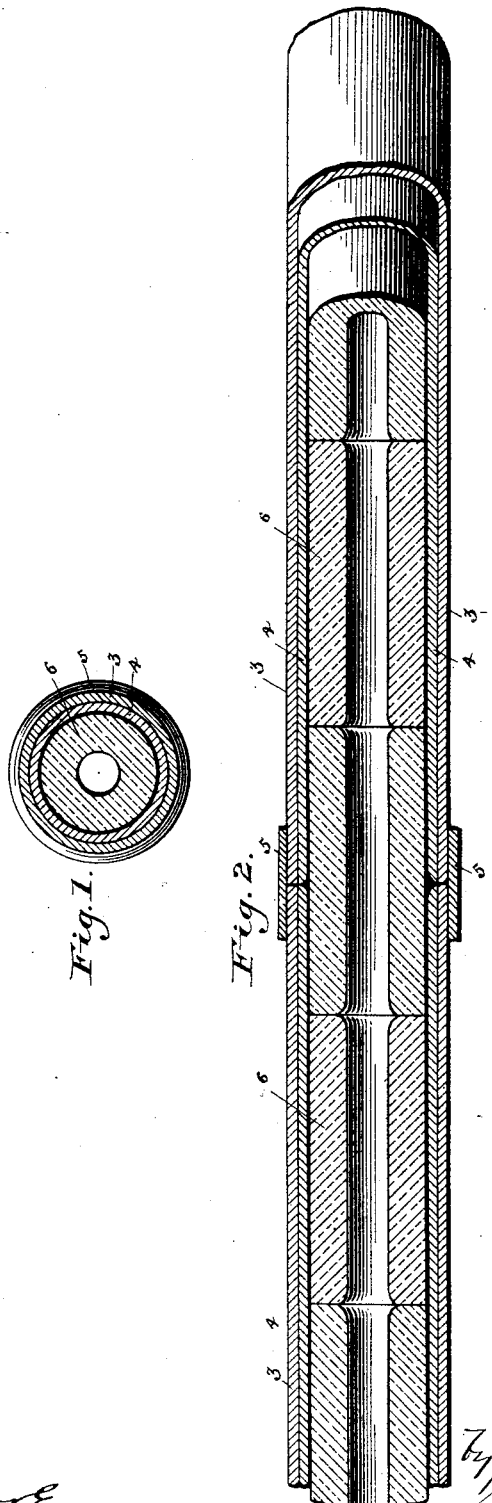
Witnesses
H. W. Elmore
M. M. Westafer
Inventor
James F. Munsie,
by Munnie & Goldsborough
Attorneys

UNITED STATES PATENT OFFICE.

JAMES F. MUNSIE, OF BROOKLYN, ASSIGNOR TO THOMAS L. COLES, OF NEW YORK, N. Y.

INSULATING-LINING.

SPECIFICATION forming part of Letters Patent No. 426,201, dated April 22, 1890.

Application filed January 17, 1890. Serial No. 337,245. (No model.)

*To all whom it may concern:*

Be it known that I, JAMES F. MUNSIE, a British subject, residing at Brooklyn, in the county of Kings and State of New York, have invented certain new and useful Improvements in Removable Insulating-Linings for Electrical Conduits; and I do hereby declare the following to be a full, clear, and exact description of the invention, such as will enable others skilled in the art to which it appertains to make and use the same.

My invention relates to certain new and useful improvements in removable insulating-linings for electrical ducts or conduits, the construction being such that after the duct or conduit is permanently laid or located in its appointed place the insulating interior lining may be inserted or removed and renewed at pleasure, in whole or in part, without disturbing or breaking into the walls of the duct or conduit itself.

In the accompanying drawings, illustrative of my invention, Figure 1 represents a cross-sectional view of an electrical duct or conduit embodying the same, and Fig. 2 represents a longitudinal section and partial elevation of said duct or conduit.

Similar numerals of reference indicate similar parts in both views.

Referring to the drawings, 3 indicates the outer protective insulating coating or covering of the main body portion 4 of a continuous rectilinear electrical conduit or duct. Said main body portion may conveniently be of iron or other cheap metallic material, or even of glass, hard rubber, or the like, according to the exigencies or circumstances of the particular use or location for which it is required. The duct or conduit is to be made up of an appropriate number of abutting sections to extend in a straight line from man-hole to man-hole throughout the system, said sections being of uniform diameter throughout. In Fig. 2 I have shown (for purposes of illustration) two of the adjacent sections of such a continuous rectilinear conduit, the two sections forming at their meeting ends a joint, encircled by the metallic collar 5, which may be shrunk over the joint, so as to make an efficient and durable connection between the two sections.

In practice the electrical duct or conduit, as above described, will be posed or laid within the ground or within the building destined to receive it, together with such other ducts or conduits as the entire service is liable to require. Whenever any one of the ducts or conduits is to be put in use for the reception of an electrical conductor, said duct or conduit is first provided with an insulating or conduit is first provided with an insulating interior lining of such capacity as to fully occupy all the interior space that would otherwise exist between the inner walls of the duct and the conductor itself, this space being designedly left somewhat large, so that the lining may have considerable thickness. The said lining is made of a series of similar sections 6, molded from a substance of high insulating properties and which is waterproof and fire-proof.

The sections 6 are hollow interiorly for the reception of the conducting-wire, and are slightly reamed at the inner edges of their meeting ends, as shown, so that there may be no accidental inward projection from said edges to interfere with the passage of the conducting-wire through the series.

When the duct or conduit is to receive its lining, the sections 6 are inserted one after the other into one end of the duct or conduit, each being pushed forward by its successor toward the opposite end until the entire duct is filled with abutting lining-sections, whose hollow interiors register with each other to form a continuous passage-way for the conductor, which is thereupon thrust forward through the said passage-way to the distance desired.

If for any reason the lining becomes defective, it may readily be removed and a new one, in whole or in part, substituted in its stead and without the necessity of disjointing or uncovering the conduit for that purpose. The sectional lining is furthermore desirable for the reason that the ducts or conduits, which are frequently posed side by side in considerable number, so as to meet prospective demands, need only be provided with linings, as desired, from time to time, thereby lessening the first cost of an efficient installation and also saving the linings for use only during the periods when the calls of the service require them.

The substance of which I preferably construct the removable sections consists ordinarily of fire-clay, Portland cement, and paper-pulp in equal parts by weight. The paper-pulp is first rendered non-inflammable by being thoroughly washed or boiled in a solution of two and a half pounds common salt, three ounces sulphate of aluminum, and three ounces sulphate of zinc to three gallons of water. The pulp is then strained from the solution and intimately admixed with the fire-clay and Portland cement, which are in a finely-pulverized condition, a sufficient quantity of a non-inflammable agglutinating material—such as white glue and silicate of soda—being added to produce an efficient adhesion or binding together of the particles. The homogeneous mixture thus obtained is then pressed or molded under heavy hydraulic pressure into the form of the sections 6 or into the form of a longer piece, afterward to be cut or sawed into such sections. The sections, being thereupon thoroughly dried in a suitable oven, are then, while still hot, immersed in a hot bath of non-inflammable waterproofing compound—such as fire-proof paint—(known commercially as "mineral paint,") or into a similar bath of india-rubber, which may thereafter be rendered non-inflammable by vulcanization. The heated article will absorb the hot liquid until the pores are filled, thereby rendering the entire mass water-proof.

It will be noted on reference to Fig. 2 that by means of my invention I can so arrange that the joint of the conduit will be covered internally by one of the insulating sections, thereby giving an additional safeguard at that point.

Having thus described my invention, what I claim is—

1. A removable sectional lining for electrical conduits, consisting of a series of sections of insulating material fitting within the inner walls of the conduit and movable through said conduit from end to end, said sections being provided with hollow interiors communicating with each other and forming a continuous passage-way for the insertion and withdrawal of the electrical conductor, substantially as described.

2. A removable sectional lining for electrical conduits, consisting of a series of sections of insulating material fitting within the inner walls of the conduit and movable through said conduit from end to end, said sections being provided with hollow interiors communicating with each other and forming a continuous passage-way for the insertion and withdrawal of the electrical conductor, and the inner edges of the abutting ends of the sections being beveled or reamed out, substantially as described.

3. A removable sectional lining for electrical conduits, consisting of a series of sections of insulating material fitting within the inner walls of the conduit and movable through said conduit from end to end, said sections being provided with hollow interiors communicating with each other and forming a continuous passage-way for the insertion and withdrawal of the electrical conductor, the conduit joints being covered internally by said sections, substantially as described.

In testimony whereof I affix my signature in presence of two witnesses.

JAMES F. MUNSIE.

Witnesses:
JOHN C. PENNIE,
A. M. PARKINS.